Frank J. Mack
INVENTOR.

F. J. MACK.
VARIABLE SPEED TRANSMISSION GEARING.
APPLICATION FILED DEC. 7, 1915.

1,205,464.

Patented Nov. 21, 1916.
2 SHEETS—SHEET 2.

Frank J. Mack
INVENTOR.

BY

ATTORNEYS.

UNITED STATES PATENT OFFICE.

FRANK J. MACK, OF CHICAGO, ILLINOIS.

VARIABLE-SPEED-TRANSMISSION GEARING.

1,205,464.  Specification of Letters Patent.  Patented Nov. 21, 1916.

Application filed December 7, 1915. Serial No. 65,539.

*To all whom it may concern:*

Be it known that I, FRANK J. MACK, a citizen of the United States, residing at Chicago, in the county of Cook and State of Illinois, have invented new and useful Improvements in Variable-Speed-Transmission Gearing, of which the following is a specification.

This invention relates to variable-speed transmission gearing in which the speed changes are effected by sliding gears. In this type of gearing it is important that the motor or other source of power be disconnected before sliding the gears, as otherwise the teeth of the gears are apt to be stripped or mutilated.

The invention therefore has for its object to provide a novel and improved means for locking the gear shifting means, such locking means being controlled by a device which actuates the clutch connecting the gearing to the motor or other source of power. The arrangement is such that the gear shifting means is locked when the clutch is on, and when the clutch is thrown to disconnect the gearing, the shifting means is unlocked, and after the gears have been shifted to the desired position, the shifting means is again locked upon engaging the clutch.

In order that the invention may be better understood, reference is had to the accompanying drawings, in which—

Figure 1:
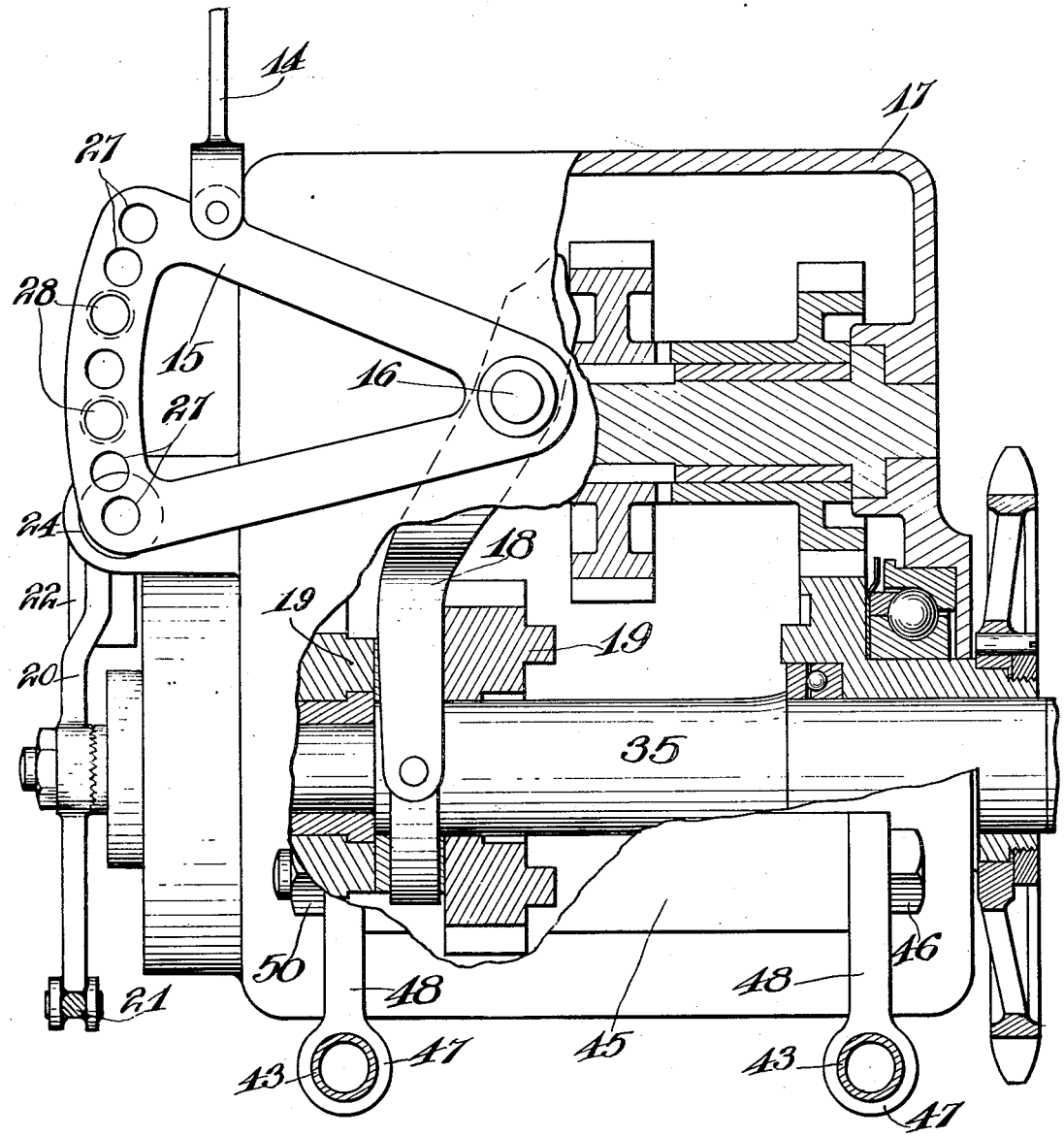
Figure 6:
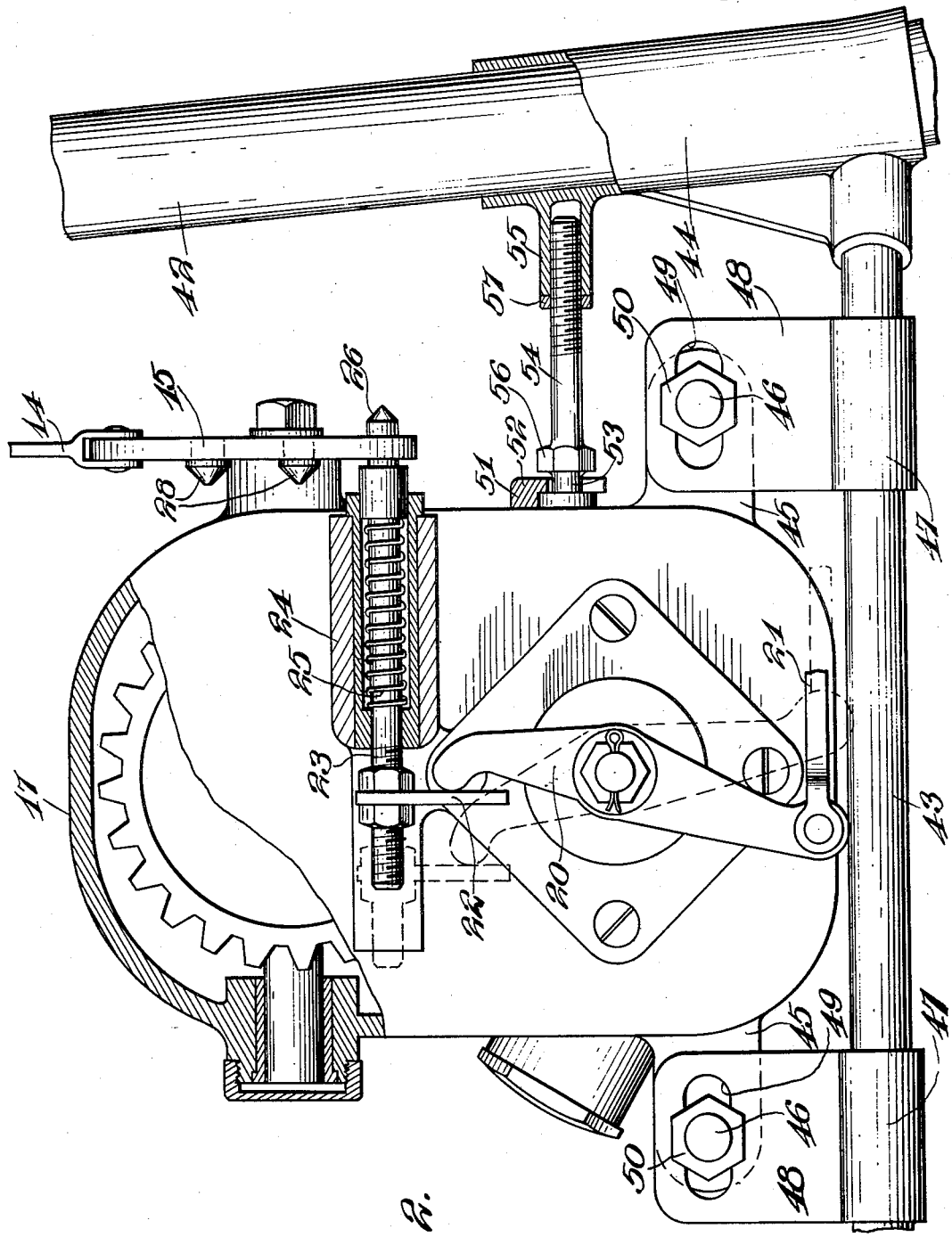

Figure 1 is a side elevation, and Fig. 2 a front elevation of the invention, partly in section.

Referring specifically to the drawings, 42 denotes one of the upright frame members of a motor cycle, and 43 are two horizontal, laterally spaced members connected to the member 42 at the lower end thereof by a suitable fitting 44. These frame members support the housing 17 of the gearing to which the present invention is applied.

The invention is designed more particularly for the application to the transmission of motor cycles, but it will, of course, be understood that it is not limited thereto, but may, with equal facility, be applied to other variable speed gearing.

The housing 17 has on its front and rear walls an integral lug or extension 45 extending transversely of the housing and provided with a longitudinal bolt hole to receive a bolt 46. On the frame members are fixed four tubular members 47 having upstanding flanges 48 which abut against the ends of the lugs 45. The bolts 46 extend through longitudinal slots 49 in the flanges 48, and are secured by nuts 50. This fastening rigidly secures the gear housing 17 on the frame members 42, and the slots 49 permit the housing to be shifted forward or rearward to take up slack in the drive chain, or to allow adjustment to any other parts.

A lock is also provided for fixing the gear housing 17 in adjusted position, this lock comprising the following parts: On the forward wall of the gear housing 17 is a lug 51 having a depending part 52 spaced from said walls, and forked or slotted to receive the neck 53 of a bolt 54, the head 54ª of which seats behind the part 52. The outer end of the bolt 54 is threaded into a lug 55 on the fitting 44. The bolt also has an angular enlargement 56 for a wrench hold. It will be seen that by turning the bolt, the gear housing will be advanced or backed, and after the adjustment has been made, the bolt is locked by a lock-nut 57 screwed against the outer end of the lug 55.

The housing 17 contains a three-speed gearing such as is used in connection with motor cycles. The driving shaft is shown at 35 on which are mounted the slidable gears 19 which are operated by the usual fork 18.

As it is necessary in a gearing of the type specified that the shaft 35 be disconnected from the motor when the gears 19 are to be shifted, a means is provided which precludes the possibility of shifting the gears while the clutch is engaged. The clutch (not illustrated, as its structure is immaterial to the present invention) is operated by a lever 20. To one end of the lever 20 is connected an actuating rod 21. In the path of the opposite end of the lever is an abutment 22 fixed on a bolt 23 slidable in a bearing 24 on the wall of the housing 17. The bolt is backed by an expanding spring 25 to hold the abutment at all times in contact with the end of the lever. The forward end of the bolt is pointed, as indicated at 26, and is held, by the spring 25, bearing against one side or face of a sector 15 having a series of keeper apertures 27 for the bolt, said apertures successively coming in line with the bolt as the sector is swung to shift the gears 19. The sector is fixed on a rock-shaft 16 carrying the gear-shifting fork 18. Thus, it will be seen that the gears 19 are shifted when the sector is swung. A suitable actuating rod 14 is connected to the sector.

The apertures 27, reckoning from the bottom one, correspond to the low speed, neutral, second speed, neutral, and high speed positions of the gears 19. Thus when the sector 15 is moved to any position, the bolt end 26 extends through the particular aperture and locks the sector. If a shift is to be made, the clutch is first released by rocking the lever, thereby retracting the bolt from the sector aperture in which it was seating. The sector may now be shifted as desired, and when it arrives at the selected position, the bolt advances into the corresponding aperture to lock the sector, when the lever 20 is actuated to throw in the clutch, this movement of the lever releasing the bolt and enabling it to be shot forward by the spring 25.

Referring to Fig. 2 it will be noted that the second speed aperture is quite distant from the neutral aperture on each side thereof. This arrangement leaves enough space between the apertures for the bolt end 26 to abut against the face of the sector 15 without locking the latter, and to preclude this, conically headed studs 28 are mounted in the spaces, these studs tending to slide the bolt end into the nearest sector aperture.

All the parts of the device are on the outside and readily accessible for adjustment or repairs.

I claim:—

1. In a change-speed gearing, a shiftable gear, means for shifting said gear, said means including a swinging member having apertures, a spring actuated locking bolt positioned to enter the apertures, an abutment on the bolt, and a clutch-actuating lever engaging the abutment and retracting the bolt when swung to disengage the clutch.

2. In a change-speed gearing, a shiftable gear, means for shifting said gear, said means including a swinging member having apertures, a locking bolt positioned to enter the apertures, an abutment on the bolt, a clutch-actuating lever engaging the abutment and retracting the bolt when swung to disengage the clutch, and projections on the swinging member alongside the apertures for guiding the bolt into the latter.

3. In a change-speed gearing, a shiftable gear, means for shifting said gear, said means including a swinging member having apertures, a locking bolt positioned to enter the apertures, an abutment on the bolt, a clutch-actuating lever in contact at one end with the abutment, and an actuating rod connected to the other end of the lever.

In testimony whereof I affix my signature.

FRANK J. MACK.